United States Patent [19]

Proffitt

[11] Patent Number: 5,487,260
[45] Date of Patent: Jan. 30, 1996

[54] LAWN RAKE

[75] Inventor: Mark Proffitt, Greeneville, Tenn.

[73] Assignee: DeJay Corporation, Palm Beach Gardens, Fla.

[21] Appl. No.: 317,616

[22] Filed: Sep. 26, 1994

[51] Int. Cl.⁶ .................................................. A01D 7/06
[52] U.S. Cl. ................................ 56/400.04; 56/400.17
[58] Field of Search ........................ 56/400.01, 400.04, 56/400.16, 400.17, 400.18, 400.20

[56] References Cited

U.S. PATENT DOCUMENTS

| | | | |
|---|---|---|---|
| D. 248,612 | 7/1978 | Oas | D8/13 |
| D. 256,880 | 9/1980 | Brock, Jr. | D8/13 |
| D. 263,367 | 4/1982 | Fodor et al. | D8/13 |
| D. 264,674 | 6/1982 | Grindlay | D8/13 |
| D. 279,349 | 6/1985 | Clivio et al. | D8/13 |
| D. 281,387 | 10/1985 | Kolb | D8/13 |
| D. 282,621 | 2/1986 | Nuorivaara | D8/13 |
| D. 282,900 | 3/1986 | Salvato | D8/13 |
| D. 292,261 | 10/1987 | Mitton | D8/13 |
| D. 293,196 | 12/1987 | Germain et al. | D8/13 |
| D. 296,510 | 6/1988 | Cohen | D8/13 |
| D. 297,101 | 8/1988 | Licht | D8/13 |
| D. 298,725 | 11/1988 | Sunila et al. | D8/13 |
| D. 298,726 | 11/1988 | Carpenter | D8/13 |
| D. 298,907 | 12/1988 | Bonnes | D8/13 |
| D. 306,682 | 3/1990 | Thompson | D8/13 |
| D. 306,962 | 4/1990 | Schuele | D8/13 |
| D. 308,805 | 6/1990 | Licht | D8/13 |
| D. 308,928 | 7/1990 | Jones | D8/13 |
| D. 311,309 | 10/1990 | McCoy | D8/13 |
| D. 311,310 | 10/1990 | Clivio | D8/13 |
| D. 314,122 | 1/1991 | Licht | D8/13 |
| D. 326,035 | 6/1992 | Gecchelin | D8/13 |
| D. 327,983 | 7/1992 | Keenan | D4/136 |
| D. 329,177 | 9/1992 | Nace et al. | D8/13 |
| D. 331,353 | 12/1992 | Valentine | D8/6 |
| D. 340,844 | 11/1993 | Iversen | D8/13 |
| D. 341,756 | 11/1993 | Bass | D8/13 |
| D. 344,661 | 3/1994 | Schuele | D8/13 |
| 3,707,835 | 1/1973 | McNally et al. | 56/400.01 |
| 3,930,544 | 1/1976 | Foster, Sr. | 172/375 |
| 3,949,542 | 4/1976 | Wood | 56/400.17 |
| 3,952,490 | 4/1976 | Brockman | 56/400.14 |
| 4,018,038 | 4/1977 | Sipe | 56/400.12 |
| 4,026,094 | 5/1977 | Sasur | 56/400.04 |
| 4,037,397 | 6/1977 | Fiorentino | 56/400.12 |
| 4,057,953 | 11/1977 | Rugg | 56/400.17 |
| 4,073,484 | 2/1978 | Beekenkamp | 269/329 |
| 4,091,879 | 6/1978 | Lomberk et al. | 172/373 |
| 4,189,908 | 2/1980 | Brock, Jr. | 56/400.17 |
| 4,212,150 | 7/1980 | Dmochowski | 56/400.06 |
| 4,215,528 | 8/1980 | Fodor | 56/400.17 |
| 4,219,993 | 9/1980 | Cosmos | 56/400.17 |
| 4,236,742 | 12/1980 | Florence | 294/24 |
| 4,244,168 | 1/1981 | Howard | 56/400.17 |
| 4,286,673 | 9/1981 | van Rooijen | 172/378 |
| 4,292,794 | 10/1981 | Gascon | 56/400.16 |
| 4,351,145 | 9/1982 | Farkas | 56/400.16 |
| 4,387,671 | 4/1983 | Gascon | 56/400.12 |

(List continued on next page.)

*Primary Examiner*—David J. Bagnell
*Attorney, Agent, or Firm*—Antonelli, Terry, Stout & Kraus

[57] ABSTRACT

A lawn rake having a clip member extending from the upper surface thereof to retain gardening gloves or other items with the rake between uses, reducing the likelihood of the gloves being misplaced. The hub of the rake head is made up of wedge-shaped sections. The upper surfaces of alternate ones of the wedge-shaped sections define a first arcuate surface, while the upper surfaces of the intermediate ones of the wedge-shaped sections define a second arcuate surface, offset from the first arcuate surface, thereby strengthening the hub and inhibiting twisting thereof. The rake tines extend from the hub and continue the wedge shape and arcuate configuration of the hub. Each tine has a rib extending down its upper surface centrally between the tine edges. A spreader bar interconnects all the tines. An outer wall extends downwardly from the lower edge of the outside surface of the hub and of each of the outermost tines. The ribs, the outer walls, and the spreader bar strengthen the tines and inhibit twisting thereof. Each of the tines is bent and is of equal length so that the tines provide a concave basket-like surface for retaining raked material.

19 Claims, 2 Drawing Sheets

U.S. PATENT DOCUMENTS

| | | | |
|---|---|---|---|
| 4,480,431 | 11/1984 | Beaudoin | 56/400.17 |
| 4,516,393 | 6/1985 | Lambert | 56/400.2 |
| 4,573,311 | 3/1986 | Ipema et al. | 56/400.17 |
| 4,596,113 | 6/1986 | Novoselsky | 56/400.16 |
| 4,606,180 | 8/1986 | Archer | 56/400.17 |
| 4,635,429 | 1/1987 | Cornelius | 56/400.18 |
| 4,649,698 | 3/1987 | Sykora | 56/400.17 |
| 4,667,458 | 6/1987 | Barrett | 56/400.16 |
| 4,667,461 | 6/1987 | Forbes | 56/400.15 |
| 4,682,464 | 7/1987 | Sun | 56/400.17 |
| 4,733,524 | 3/1988 | Forbes | 56/400.15 |
| 4,744,208 | 5/1988 | King | 56/400.16 |
| 4,791,780 | 12/1988 | Phillips | 56/400.04 |
| 4,821,500 | 4/1989 | MacIvergan | 56/400.14 |
| 4,831,815 | 5/1989 | Bonnes | 56/400.17 |
| 4,848,073 | 7/1989 | Germain et al. | 56/400.12 |
| 4,848,074 | 7/1989 | Allen | 56/400.04 |
| 4,866,922 | 9/1989 | Clark | 56/400.01 |
| 4,970,853 | 11/1990 | Greene, III | 56/400.01 |
| 4,985,961 | 1/1991 | Kegley | 16/111 R |
| 4,996,834 | 3/1991 | Geist | 56/400.17 |
| 5,003,760 | 4/1991 | Webb | 56/400.06 |
| 5,022,221 | 6/1991 | Bonnes et al. | 56/400.17 |
| 5,025,621 | 6/1991 | DeMarco | 56/400.05 |
| 5,033,261 | 7/1991 | Bonnes et al. | 56/400.17 |
| 5,058,370 | 11/1991 | Russell | 56/400.12 |
| 5,069,026 | 12/1991 | Johnson | 56/400.11 |
| 5,079,905 | 1/1992 | Bergstrom | 56/8 |
| 5,099,638 | 3/1992 | Bass | 56/400.16 |
| 5,133,177 | 7/1992 | Miller | 56/400.16 |
| 5,142,855 | 9/1992 | Guidarelli | 56/400.16 |
| 5,144,791 | 9/1992 | Sun | 56/400.04 |
| 5,161,360 | 11/1992 | Hill | 56/400.17 |
| 5,177,946 | 1/1993 | Dietz, Jr. | 56/400.16 |
| 5,177,947 | 1/1993 | Sun | 56/400.17 |
| 5,182,899 | 2/1993 | Sun | 56/400.17 |
| 5,230,385 | 7/1993 | Dianatale | 172/378 |
| 5,287,688 | 2/1994 | Sun | 56/400.19 |
| 5,343,684 | 9/1994 | Siler III | 56/400.16 |

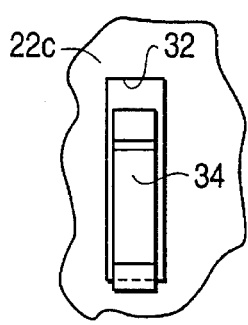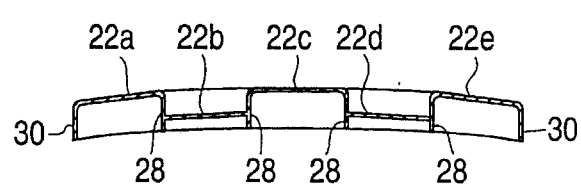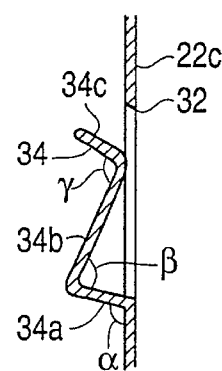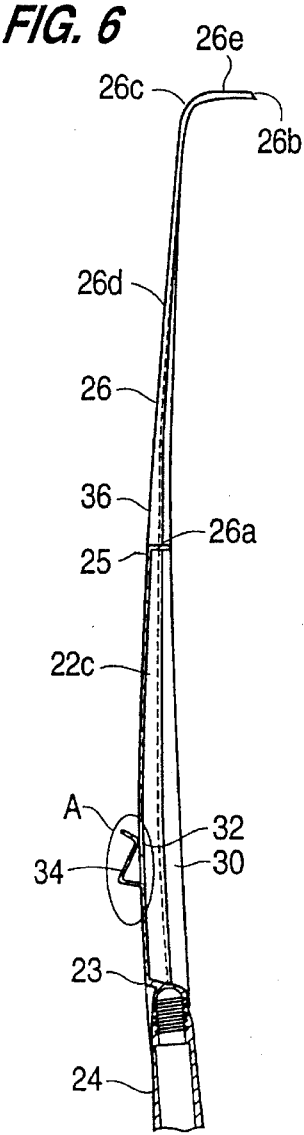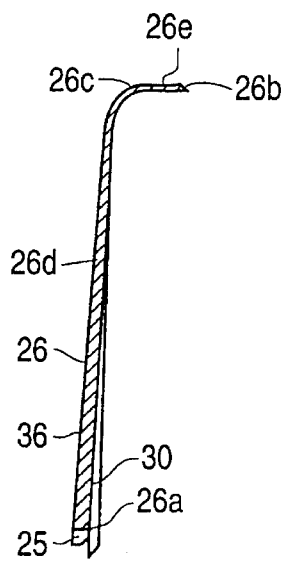

5,487,260

LAWN RAKE

TECHNICAL FIELD

The present invention relates to a lawn rake. More particularly, the present invention relates to a lawn rake including a clip for retaining gardening gloves or other items with the rake, particularly during times of nonuse so that such items will be available with the rake during the next time of use.

In another aspect, the present invention relates to a lawn rake having an arcuate configuration, with the ends of the rake tines lying in an arc, the tines being sufficiently flexible to assure that slight downward pressure during raking maintains the tines in close contact with the ground, thus assuring efficient and thorough raking, while maintaining the arcuate configuration to provide a concave basket-like surface for retaining a large volume of leaves, grass, and other raked material. The rake includes wedge-shaped sections, the upper surfaces of alternating ones of which define a first arcuate surface while the upper surfaces of the intermediate ones define a second arcuate surface offset from the first arcuate surface. As a result, the rake hub is strengthened, and flexing of the hub is inhibited.

BACKGROUND ART

Many people wear gardening gloves while raking in order to protect their hands. After raking, the rake is stored in one location, and the gloves in another. As a consequence, it is inconvenient to get both the gloves and the rake the next time the rake is to be utilized. Often the person will take the rake to the job site, forgetting the gloves. The person must then return and get the gloves. Alternatively, the gloves may be stored by the rake, usually in an insecure place. The gloves can still be forgotten the next time the rake is used. Further, since the gloves are not securely retained, they may be accidently moved and so go astray.

An arcuate shape to a rake is desirable to provide a basket effect permitting raking of a greater volume of leaves, grass, or other material. Presently known rakes having arcuate structures are complex devices made up of a number of parts, which complicates the manufacturing process and which increases the likelihood of a part failing, making the rake unusable. U.S. Pat. Nos. 4,189,908 and Des. 256,880 disclose an arcuate garden rake which relies upon a pair of tine-retaining strips provided with a complex nipple and cup arrangement to cause the tines to assume a crown or arcuate shape. The nipple and cup arrangement of the tine-retaining strips presents many locations at which failure can occur, severely decreasing or totally eliminating the usability of the rake. In addition, the complex nature of the tine-retaining strips necessitates a complex manufacturing process.

U.S. Pat. No. 3,707,835 shows a rake having an arcuately-shaped rim from which tines extend. Nevertheless, the tines are separate components which must be separately installed into the rim or hub of the rake.

U.S. Pat. No. Des. 282,900 shows a rake, the tine ends of which appear to lie in an arc. However, that rake is also made of numerous components which are tedious to assemble and make the rake subject to malfunctioning.

U.S. Pat. No. 5,161,360 discloses a rake having tines of unequal length to cause the tine ends to lie on an arc, but the tine ends are shaped in a manner decreasing the ability of the tines to thoroughly rake over an area and increasing the likelihood that one or more tines will catch on a tree root, a rock, or another obstacle.

U.S. Pat. No. Des. 298,725 shows a rake in which the tine ends lie on an arc, but the tines appear to be separate components from the hub, therefore requiring difficult assembly. Further, the tines appear to be susceptible to twisting during raking, thereby reducing the raking efficiency.

DISCLOSURE OF INVENTION

The present invention is a rake overcoming these shortcomings of the prior art. In one aspect, the present invention is a lawn rake having a flexible clip extending from the upper surface of the rake and overlying an opening in that upper surface. Gloves or other items can be inserted beneath the clip to retain the gloves with the rake when not in use.

In another aspect, the present invention is a lawn rake having a head including a hub with a plurality of tines extending from it, the rake head being made as a single piece by a molding process from a durable, yet relatively inexpensive, material, such as a polypropylene homopolymer, permitting simplified manufacture of the rake head. The hub is made up of a plurality of wedge-shaped sections flaring out from a first end connected to the rake handle to a second end from which a plurality of tines extend. The upper surfaces of alternating ones of the plurality of wedge-shaped sections define a first arcuate surface, while the upper surfaces of the intermediate ones of the plurality of wedge-shaped sections define a second arcuate surface offset from the first arcuate surface. As a result, the wedge-shaped hub is strengthened, and flexing of the hub is inhibited. Further, each tine has a rib extending along its upper surface substantially centrally between its side edges over the length of the tine to strengthen the tine and inhibit twisting of it.

Each of the tines is bent substantially at a point between its proximal end and its distal end to direct the distal portion of the tine away from the upper surface of the proximal portion. The bends of the tines are at substantially equal distances from the tine proximal ends at the hub so that the outer surfaces of the bends define a first arc. The distal portions of the tines extend substantially equal distances from the bends to the tine distal ends.

The arcuate surfaces of the hub portion cause the upper surfaces of the ribs on the tines to substantially define an extension of the hub portion first arcuate surface and cause the distal ends of the tines to lie in a second arc. The rake head is made of a suitable material, such as a thermoplastic compound which can be molded, for example, a polypropylene homopolymer 30% $CaCO_3$ filled. The rake thus has sufficient strength and rigidity to withstand the stresses of raking and avoid twisting, and yet the hub and the tines are sufficiently flexible to permit slight downward pressure on the handle, when the distal ends of the tines are brought to the ground, to cause the tines to flex, assuring that the distal ends of the tines are in close contact with the ground, thus assuring efficient and thorough raking, while forming a basket-like surface to hold a volume of leaves, grass, or other raked material.

BRIEF DESCRIPTION OF DRAWINGS

These and other aspects and advantages of the present invention are more apparent from the following detailed description and claims, particularly, when considered in conjunction with the accompanying drawings. In the drawings:

FIG. 3 is a sectional view taken along the line 3—3 of FIG. 1;

FIGS. 4 and 5 are enlarged, fragmentary views of portion A of FIG. 6;

FIG. 6 is a sectional view taken along line 6—6 of FIG. 1;

FIG. 7 is a sectional view taken along line 7—7 of FIG. 1; and

FIG. 8 is a sectional view taken along line 8—8 of FIG. 2.

BEST MODE FOR CARRYING OUT THE INVENTION

Figure 1:
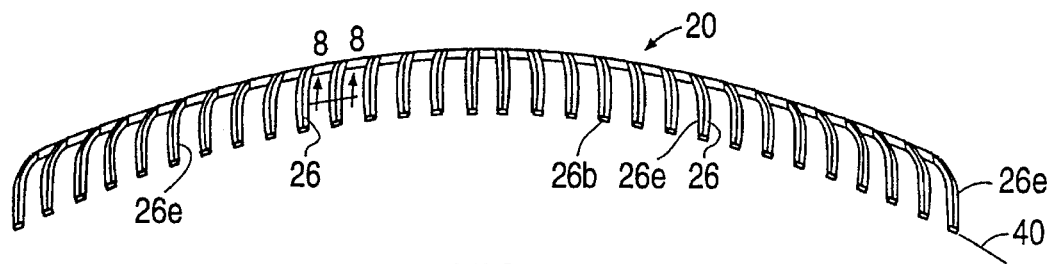
FIG. 1 is a plan view of the upper surface of a rake head in accordance with a preferred embodiment of the present invention.
Figure 2:
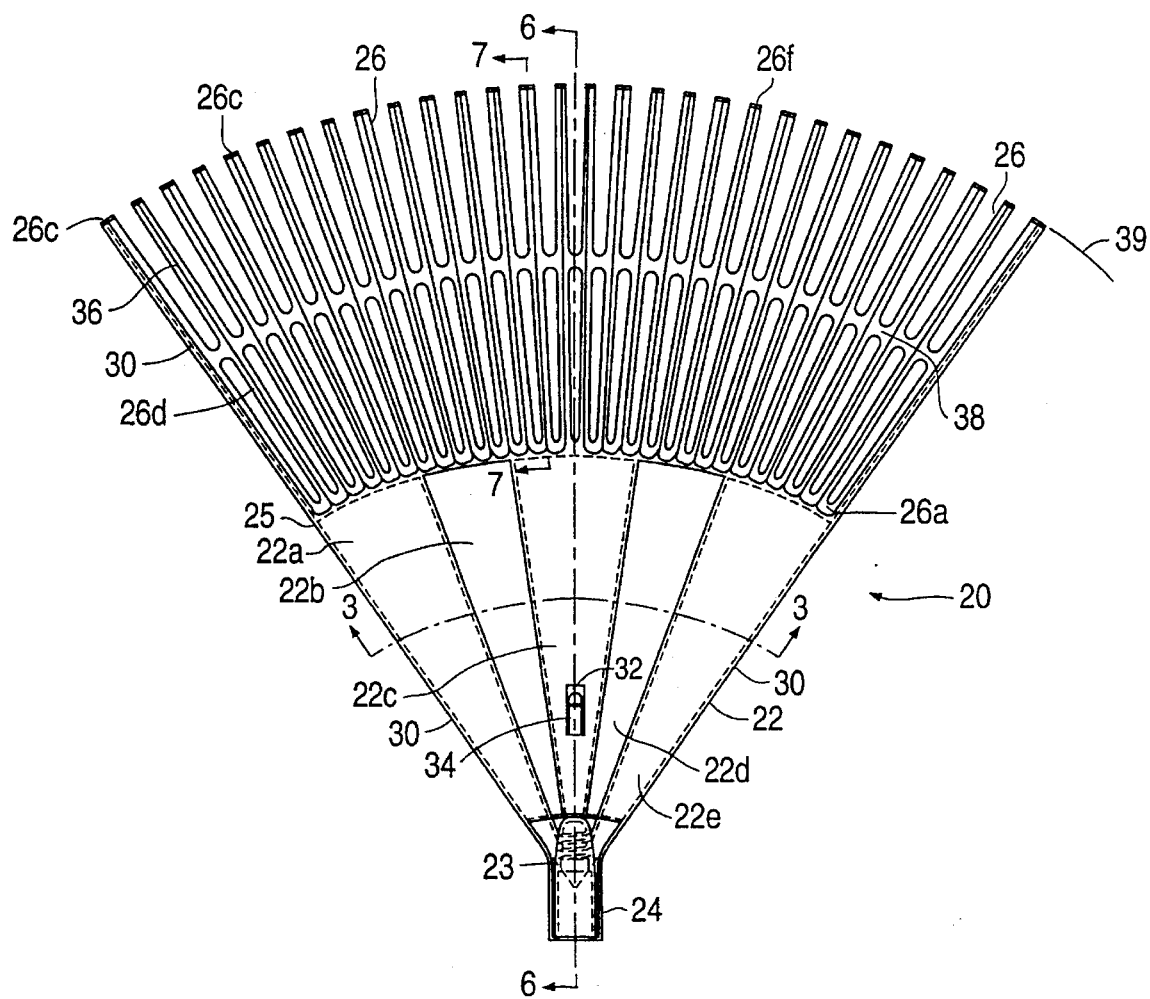
FIG. 2 is an end view of the rake head of FIG. 1.

FIGS. 1 and 2 depict a rake head 20 in accordance with the present invention. Rake head 20 includes a hub portion 22 having a wedge shape and flaring out from an inner end 23 to an outer end 25 from which a plurality of tines 26 extend. Inner end 23 is connected to a socket portion 24 which is adapted to receive a rake handle in the form of an elongated rod.

Hub portion 22 includes a plurality of wedge-shaped sections, depicted as five sections 22a–22e in the illustrative embodiment of the drawings. Each wedge-shaped section 22a–22e flares out from socket portion 24 to tines 26. As can best be seen in FIG. 3, alternating ones of the wedge-shaped sections 22a, 22c and 22e have upper surfaces which define a first arcuate surface, while the intermediate ones of the wedge-shaped sections 22b and 22d have upper surfaces which define a second arcuate surface offset from the first arcuate surface of sections 22a, 22c and 22e. Adjacent ones of the sections 22a–22e are joined by walls 28. The outside surfaces of outermost wedge-shaped sections 22a and 22e include a similar outer wall 30. Walls 28, 30 extend downwardly from the lower surfaces of sections 22a–22e Thus, as can be appreciated from FIG. 3, the hub portion 22 has a wedge shape with an arcuate cross section. The offset surfaces of the alternating ones of the hub sections 22a–22e and the walls 28, 30 add strength to the hub portion 22 and inhibit flexing of the hub, thereby strengthening the entire rake head.

A clip member 34 extends upwardly from the upper surface of the central wedge-shaped section 22c, intermediate inner end 23 and outer end 25 of hub portion 22, as depicted particularly in FIGS. 4 and 5. In its preferred embodiment, clip 34 has a somewhat Z-shape and includes a first portion 34a extending outwardly from the upper surface of wedge-shaped section 22c at an angle $\alpha$ of approximately 100° with respect to the upper surface of section 22c, a second portion 34b extending back toward the plane of the upper surface of wedge-shaped section 22c at an angle $\beta$ of approximately 75° with respect to portion 34a, and a third portion 34c extending away from the upper surface of section 22c at an angle $\gamma$ of approximately 60° with respect to portion 34b. To aid in removal of rake head 20 from a mold during the manufacturing process, and to increase the flexibility of clip member 34, an opening 32 can be provided beneath clip 34. Clip 34 can hold a pair of gardening gloves or other such item on rake head 20 when the rake is stored between uses so that such gloves will be readily available for the next use.

FIGS. 6–8 show details of the tines 26. Each tine 26 extends from the outer end 25 of hub portion 22 from the tine proximal end 26a to the tine distal end 26b. Each tine 26 is bent at a point 26c, defining a proximal portion 26d between proximal end 26a and bend 26c and a distal portion 26e between bend 26c and distal end 26b. The bend is approximately 90° so that when the rake is in use, the distal portions 26e are directed toward the ground.

A rib 36 extends upwardly from the upper surface of each tine 26. As can be seen from FIG. 6, the upper surfaces of the ribs substantially define an extension of the first arcuate surface of alternate sections 22a, 22c and 22e of hub portion 22. If desired, the upper surfaces of the tines may define an extension of the second arcuate surface of intermediate sections 22b and 22d. As can be appreciated from FIGS. 6 and 7, the ribs 36 merge into the tines 26 over the length of the proximary portions 26d of the tines.

As seen in FIG. 1, the tines continue the wedge-shaped configuration of hub portion 22. Preferably all the tines 26 are joined together by a spreader bar 38 intermediate the proximal ends 26a and the bends 26c of the tines. Preferably, also, outer walls 30 on the outside surfaces of outermost wedge-shaped hub sections 22a and 22e continue along the outside edges of the lower surface of the outermost tines 26 over the length of proximal portions 26d. Ribs 36, walls 30, and spreader bar 38 strengthen the tines and inhibit twisting of the tines as the rake is used.

The arcuate cross section of hub portion 22 results in the tines 26 having an arcuate configuration. The tines 26 are of equal length, with the proximal portions 26d being of equal length and the distal portions 26e being of equal length so that the outer surfaces of bends 26c define an arc 39, as can be seen in FIG. 1. Because of all these factors, distal ends 26b of the tines 26 define an arc 40 as depicted in FIG. 2. As a consequence, a slight downward pressure applied to the rake during raking assures that all the tines maintain contact with the ground to assure thorough and efficient raking, while the tines provide a concave basket-like surface for retaining a large volume of leaves, grass, or other raked material.

Although the present invention has been described with reference to a preferred embodiment, numerous modifications could be made, and still the result would be within the scope of the invention.

I claim:

1. A rake head comprising:

a hub portion having a plurality of wedge-shaped sections flaring out from a hub portion first end to a hub portion second end, each section having an upper surface and a lower surface, the upper surfaces of alternating ones of said plurality of wedge-shaped sections defining a first arcuate surface, and the upper surfaces of the intermediate ones of said plurality of wedge-shaped sections defining a second arcuate surface offset from said first arcuate surface, thereby strengthening said hub portion and inhibiting flexing thereof, said hub portion having an opening passing through a central one of said plurality of wedge-shaped sections, intermediate said hub portion first end and said hub portion second end, and having a clip member extending from the upper surface of said central one of said plurality of wedge-shaped sections and over the opening to permit said clip member to cooperate with said upper surface to retain items clipped onto said rake head;

a socket portion attached to said first end of said hub portion and having a recess adapted for receiving a rake handle;

a plurality of tines extending from said hub portion in a wedge-shaped configuration continuing the wedge shape and arcuate configuration of said hub portion, each tine having a tine first end attached to said second end of said hub portion, a tine second end, an upper surface, a lower surface, a first side edge, a second side edge, and a rib extending along said tine upper surface, substantially centrally between said first and second side edges, from said tine first end substantially to said tine second end;

an outer wall extending downwardly from the lower surface of said hub portion along each outside edge thereof and continuing along the outside edge of the lower surface of each of the outermost tines of said wedge-shaped configuration of tines over substantially the length of said tine first portions; and a spreader bar member interconnecting all of said tines at a point intermediate said tine first and second ends;

said ribs, said outer walls, and said spreader bar member strengthening said tines and inhibiting twisting thereof;

each of said tines being bent at a point between said tine first end and said tine second end to define a tine first portion adjacent said hub portion and a tine second portion remote from said hub portion, said tine first portions having substantially equal lengths, and said tine second portions having substantially equal lengths;

the arcuate configuration of said hub portion and said tines causing said second ends of said tines to lie in an arc;

said tines being sufficiently flexible to permit downward pressure on a handle received in said socket portion, when said second ends of said tines are in contact with the ground, to cause said tines to flex, assuring close contact of said second ends of said tines with the ground while retaining the arcuate shape of said tines to provide a concave basket-like surface for retaining raked materials.

2. A rake head as claimed in claim 1, wherein said rake head is a single piece of molded thermoplastic compound.

3. A rake head, comprising:

a socket portion having a recess adapted for receiving a rake handle;

a hub portion having a first end attached to said socket portion, a second end, an upper surface, and a lower surface, with a clip member extending from said upper surface, intermediate said hub portion first end and said hub portion second end, and with an opening through said hub portion beneath said clip member, said clip member and the opening cooperating with said upper surface to permit clipping of items onto said rake head to retain the items with said rake head; and a plurality of tines extending from said second end of said hub portion.

4. A rake head as claimed in claim 3, wherein:

said tines extend from said hub portion second end in a configuration having an arcuate cross-section;

each tine has a tine first end attached to said second end of said hub portion, a tine second end, an upper surface, a lower surface, a first side edge, a second side edge, and a rib extending along said tine upper surface, substantially centrally between said first and second side edges, from said tine first end substantially to said tine second end; and said rake head further comprises a spreader bar member interconnecting all of said tines at a point intermediate said tine first and second ends;

said ribs and said spreader bar member strengthening said tines and inhibiting twisting thereof.

5. A rake head as claimed in claim 4, wherein:

said tines extend from said hub portion second end in a configuration having an arcuate cross-section;

each of said tines is bent at a point between a tine first end, attached to said second end of said hub portion, and a tine second end to define a tine first portion adjacent said hub portion and a tine second portion remote from said hub portion, said tine first portions having substantially equal lengths, and said tine second portions having substantially equal lengths;

the arcuate configuration of said tines causes said second ends of said tines to lie in an arc; and said tines are sufficiently flexible to permit downward pressure on a handle received in said socket portion, when said second ends of said tines are in contact with the ground, to cause said tines to flex, assuring close contact of said second ends of said tines with the ground while retaining the arcuate shape of said tines to provide a concave basket-like surface for retaining raked materials.

6. A rake head as claimed in claim 5, further comprising an outer wall extending downwardly from the lower surface of said hub portion along each outside edge thereof and continuing along the outside edge of the lower surface of each of the outermost tines of said plurality of tines over substantially the length of said tine first portions to aid in strengthening said tines and inhibiting twisting thereof.

7. A rake head as claimed in claim 6, wherein said rake head is a single piece of molded thermoplastic compound.

8. A rake head as claimed in claim 3, wherein said rake head is a single piece of molded thermoplastic compound.

9. A rake head, comprising:

a socket portion having a recess adapted for receiving a rake handle;

a hub portion having a first end attached to said socket portion, a second end, an upper surface, and a lower surface; and a plurality of tines extending from said second end of said hub portion, wherein:

said hub portion comprises a plurality of wall members and a plurality of wedge-shaped sections flaring out from said hub portion first end to said hub portion second end, said wall members extending substantially perpendicular to said upper and lower surfaces to join said wedge-shaped sections with the upper surfaces of alternating ones of said plurality of wedge-shaped sections defining a first arcuate surface, and the upper surfaces of the intermediate ones of said plurality of wedge-shaped sections defining a second arcuate surface offset from said first arcuate surface, thereby strengthening said hub portion and inhibiting flexing thereof.

10. A rake head as claimed in claim 9, wherein said tines extend from said hub portion second end in a wedge-shaped configuration continuing the wedge shape and arcuate configuration of said hub portion.

11. A rake head as claimed in claim 9, wherein:

each tine has a tine first end attached to said second end of said hub portion, a tine second end, an upper surface, a lower surface, a first side edge, a second side edge, and a rib extending along said tine upper surface, substantially centrally between said first and second side edges, from said tine first end substantially to said tine second end; and said rake head further comprises a spreader bar member interconnecting all of said tines at a point intermediate said tine first and second ends;

said ribs and said spreader bar member strengthening said tines and inhibiting twisting thereof.

12. A rake head as claimed in claim 9, wherein:

said tines extend from said hub portion second end in an arcuate configuration continuing the arcuate configuration of said hub portion;

each of said tines is bent at a point between a tine first end, attached to said second end of said hub portion, and a tine second end to define a tine first portion adjacent said hub portion and a tine second portion remote from said hub portion, said tine first portions having substantially equal lengths, and said tine second portions having substantially equal lengths;

the arcuate configuration of said hub portion and said tines causes said second ends of said tines to lie in an arc; and said tines are sufficiently flexible to permit downward pressure on a handle received in said socket portion, when said second ends of said tines are in contact with the ground, to cause said tines to flex, assuring close contact of skid second ends of said tines with the ground while retaining the arcuate shape of said tines to provide a concave basket-like surface for retaining raked material.

13. A rake head as claimed in claim 12, further comprising an outer wall extending downwardly from the lower surface of said hub portion along each outside edge thereof and continuing along the outside edge of the lower surface of each of the outermost tines of said wedge-shaped configuration of tines over substantially the length of said tine first portions to aid in strengthening said tines and inhibiting twisting thereof.

14. A rake head as claimed in claim 9, further comprising a clip member extending from the upper surface of a central one of said plurality of wedge-shaped sections, intermediate said hub portion first end and said hub portion second end, and wherein said central one of said plurality of wedge-shaped sections has an opening passing therethrough beneath said clip member, said clip member and the opening cooperating with said upper surface to permit clipping of items onto said rake head to retain the items with said rake head.

15. A rake head as claimed in claim 14, wherein said rake head is a single piece of molded thermoplastic compound.

16. A rake head as claimed in claim 9, wherein said rake head is a single piece of molded thermoplastic compound.

17. A rake head comprising:

a hub portion having a plurality of wall members and a plurality of wedge-shaped sections flaring out from a hub portion first end to a hub portion second end, each section having an upper surface and a lower surface, said wall members extending substantially perpendicular to said upper and lower surfaces to join said wedge-shaped sections with the upper surfaces of alternating ones of said plurality of wedge-shaped sections defining a first arcuate surface, and the upper surfaces of the intermediate ones of said plurality of wedge-shaped sections defining a second arcuate surface offset from said first arcuate surface, thereby strengthening said hub portion and inhibiting flexing thereof;

a socket portion attached to said first end of said hub portion and having a recess adapted for receiving a rake handle; and a plurality of tines extending from said hub portion in a wedge-shaped configuration continuing the wedge shape and arcuate configuration of said hub portion, each tine having a tine first end attached to said second end of said hub portion, a tine second end, an upper surface, a lower surface, a first side edge, a second side edge, and a rib extending along said tine upper surface, substantially centrally between said first and second side edges, from said tine first end substantially to said tine second end; and a spreader bar member interconnecting all of said tines at a point intermediate said tine first and second ends;

said ribs and said spreader bar member strengthening said tines and inhibiting twisting thereof;

each of said tines being bent at a point between said tine first end and said tine second end to define a tine first portion adjacent said hub portion and a tine second portion remote from said hub portion, said tine first portions having substantially equal lengths, and said tine second portions having substantially equal lengths;

the arcuate configuration of said hub portion and said tines causing said second ends of said tines to lie in an arc; and said tines being sufficiently flexible to permit downward pressure on a handle received in said socket portion, when said second ends of said tines are in contact with the ground, to cause said tines to flex, assuring close contact of said second ends of said tines with the ground while retaining the arcuate shape of said tines to provide a concave basket-like surface for retaining raked material.

18. A rake head as claimed in claim 17, further comprising an outer wall extending downwardly from the lower surface of said hub portion along each outside edge thereof and continuing along the outside edge of the lower surface of each of the outermost tines of said wedge-shaped configuration of tines over substantially the length of said tine first portions to aid in strengthening said tines and inhibiting twisting thereof.

19. A rake head as claimed in claim 15, wherein said rake head is a single piece of molded thermoplastic compound.

* * * * *